No. 696,828. Patented Apr. 1, 1902.
E. C. LOETSCHER.
DRAFTSMAN'S INSTRUMENT.
(Application filed Apr. 3, 1901.)
(No Model.) 2 Sheets—Sheet 1.
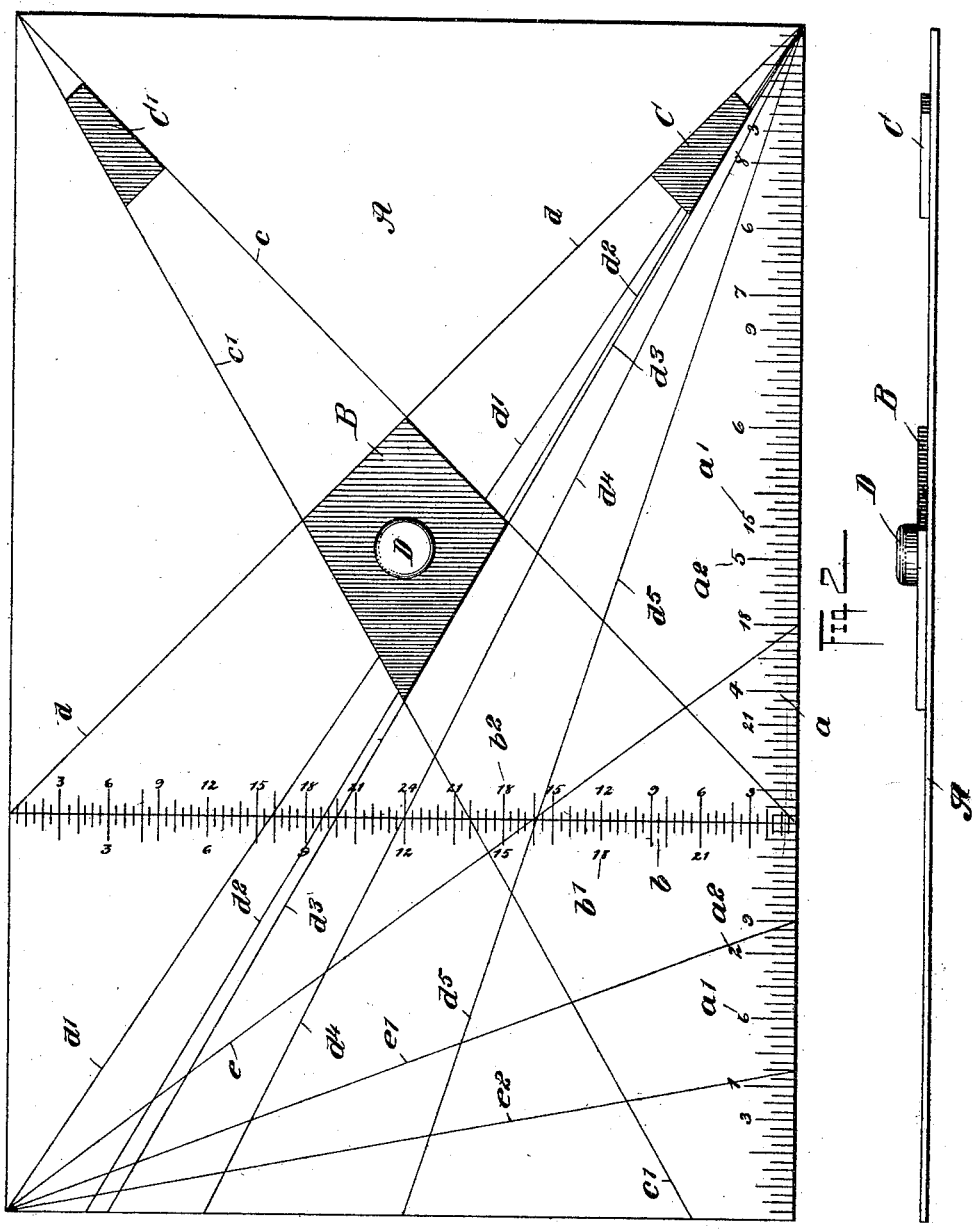
WITNESSES:
INVENTOR
Emil C. Loetscher
BY
ATTORNEYS
THE NORRIS PETERS CO., PHOTO-LITHO., WASHINGTON, D. C.

No. 696,828. Patented Apr. 1, 1902.
E. C. LOETSCHER.
DRAFTSMAN'S INSTRUMENT.
(Application filed Apr. 3, 1901.)
(No Model.) 2 Sheets—Sheet 2.
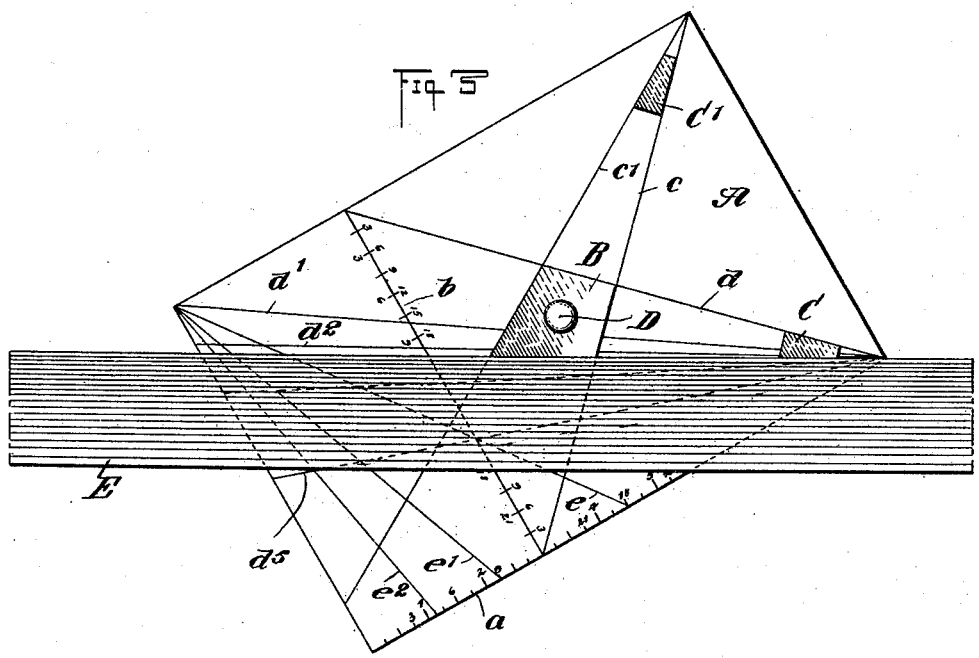
WITNESSES:
INVENTOR
Emil C. Loetscher
BY
ATTORNEYS

UNITED STATES PATENT OFFICE.

EMIL CHRISTIAN LOETSCHER, OF PITTSBURG, PENNSYLVANIA.

DRAFTSMAN'S INSTRUMENT.

SPECIFICATION forming part of Letters Patent No. 696,828, dated April 1, 1902.

Application filed April 3, 1901. Serial No. 54,180. (No model.)

*To all whom it may concern:*

Be it known that I, EMIL CHRISTIAN LOETSCHER, a citizen of the United States, and a resident of Pittsburg, in the county of Allegheny and State of Pennsylvania, have invented new and useful Improvements in Draftsmen's Instruments, of which the following is a full, clear, and exact description.

My invention relates to draftsmen's instruments, and has for its object to provide a simple and convenient tool for drawing lines at various angles, for dividing lines into various numbers of parts, and for readily solving other problems occurring in draftsmen's practice.

To this end my invention consists in the particular construction and arrangement of parts hereinafter described and claimed.

Reference is to be had to the accompanying drawings, forming a part of this specification, in which similar characters of reference indicate corresponding parts in all the figures.

Figure 1 is a plan of my improved instrument. Fig. 2 is an elevation thereof, and Fig. 3 illustrates the use of the instrument in connection with a T-square.

The improved implement comprises a thin plate A, preferably of rectangular shape, as shown, and made of a transparent material of sufficient stiffness, such as celluloid. Along one or all of the edges of the instrument or parallel thereto is arranged a scale or scales $a$, divided in any suitable manner, and the scale may be provided with two or more series of numerals $a'$ and $a^2$, respectively, so that it may be used for measurements according to different scales. At right angles to the scale $a$ is disposed another scale $b$, with two or more series of numerals $b'$ $b^2$, one of which, as $b'$, is preferably identical as to the size of the divisions with one of the other scales, as $a'$. The scales are numbered consecutively from one end to the other, except the scale $b^2$, which is numbered upward from both ends to the center, and the scale $a'$, which is numbered upward from both ends to the point where it meets the scales $b'$ $b^2$. These scales are to be numbered consecutively from each end and then reversed—*e. g.*, "1 3 6 9," "9 6 3 1." Other systems of numbering may also be used.

On the plate A are further produced a series of lines starting from different corners. From one corner extend two lines $c$ $c'$, forming, with the adjacent short side of the rectangle, angles of forty-five and sixty degrees, respectively, so that these two lines inclose an angle of fifteen degrees between them. From the right-hand lower corner are produced a series of lines $d$ $d'$ $d^2$ $d^3$ $d^4$ $d^5$, of which the lines $d$ $d^3$ form angles of forty-five degrees and thirty degrees, respectively, with the edge along which the scale $a$ is arranged. The scale $b$ is arranged so as to form a square, and consequently the lines $c$ and $d$ are drawn to the ends of the scale $b$. The line $d^2$ is drawn to a point at one-tenth of the distance between two corners, line $d^4$ to a point at one-fourth of this distance, and line $d^5$ bisects the short side of the rectangle. Line $d'$ is the diagonal of the rectangle and represents a rise of two in three, since this is the proportion of the length of the short side to the length of the long side. From the upper left-hand corner extend (in addition to the diagonal $d'$) three lines $e$ $e'$ $e^2$, of which the line $e$ bisects the edge along which the scale $a$ is produced, the line $e'$ is drawn to a point distant from the corner one-fourth of the length of said edge, and the line $e^2$ to a point at one-eighth of said distance.

In the quadrilateral inclosed between the lines $c$ $c'$ $d$ $d^3$ I secure to the plate A a block B of the same shape as said quadrilateral, and near the corners, between the lines $c$ $c'$ and $d$ $d^3$, respectively, I secure blocks C C', fitting between said lines exactly, the blocks C, C', and B projecting from the face of the plate A on one side thereof.

To facilitate the manipulation of the instrument, a knob D is preferably secured to the block B.

One of the peculiarities of my instrument consists in the fact that all characters or numerals are printed, engraved, or otherwise produced thereon reversed—that is, as ordinary numerals would appear in a mirror. Fig. 1 therefore shows the numerals of the scales $a'$ $a^2$ $b'$ $b^2$ as they appear through the transparent plate A, it being understood that these numerals, as well as the various lines, are upon the lower face of the plate. The lines and numerals will therefore be immediately adjacent to the paper or other material, so that there will be no parallax due to the thickness of the material, as there would be if the face on which the scales and lines are produced had to be used uppermost.

The improved instrument may be used in various ways, either alone or in connection with other instruments, as triangles and T-squares. It may be used for drawing lines parallel with the T-square by resting one edge of the plate A against the square, holding the pencil or ruling-pen against the opposite edge of the plate, and moving both the plate and the pencil along the T-square. Measurements may be accurately marked by the use of the various scales, and lines of various inclinations may be drawn whether the angle be given in degrees or indicated by its tangent, as when the rise per unit of length is given. The angles for which the instrument shown is constructed are fifteen degrees, thirty degrees, forty-five degrees, and sixty degrees. Fig. 3 shows the plate A slid partly under the T-square E, with the lower edges of the blocks B C against the upper edge of the square. A ruler or another of my instruments held against the upper edges of the blocks B C will then enable a line to be drawn at an angle of fifteen degrees to the edge of the square. At the same time the short side of the plate A will give the direction of lines at an angle of sixty degrees to the edge of the square, and the long side of the plate will enable lines to be drawn at an angle of thirty degrees to the edge of the square. By turning the plate A around to bring the opposite edges of the blocks B C against the edge of the square or by bringing the blocks B C' against the square the direction in which the edges of the plate slant may be reversed.

The various lines, as $d^2$ $d^4$ $d^5$, which divide the edge of the plate A in a certain proportion are used for the convenient division of lines into a number of equal parts. Thus, assuming it is desired to divide a line into ten parts, the short edge to which the lines $d^2$ $d'$, &c., lead will be brought into a direction parallel with that of the line to be divided, and a rule or T-square will be held against the graduated long edge of the plate, said edge being in alinement with one end of the line to be divided. The plate A is then moved until the end of the line to be divided coincides with the diagonal $d'$. The line $d^2$ will then intersect the line to be divided at a point one-tenth of the length of said line from one end thereof.

The instrument may be used in various other ways, but the above examples will suffice to demonstrate its utility.

Having thus described my invention, I claim as new and desire to secure by Letters Patent—

1. A drawing instrument, comprising a transparent or translucent rectangular plate having on one of its surfaces longitudinal and transverse scales and reversed characters for said scales and provided approximately at its center with a trapezoidal-shaped block, as set forth.

2. A drawing instrument, comprising a transparent or translucent rectangular plate having on one of its surfaces a longitudinal scale along one edge, a transverse scale spaced from one edge and reverse characters for said scales, and provided approximately at its center with a trapezoidal-shaped block, as set forth.

3. A drawing instrument, consisting of a rectangular plate having longitudinal and transverse scales and lines radiating from two or more corners of the plate and intersecting each other.

4. A drawing instrument, consisting of a rectangular plate having a longitudinal scale and a transverse scale extending from the first-named scale at such a point as to divide the rectangle into a square and a smaller rectangle and lines radiating from one of the corners of said square.

5. A drawing instrument consisting of a rectangular plate having a longitudinal scale and a transverse scale extending from the first-named scale at such a point as to divide the rectangle into a square and a smaller rectangle, and provided with a block projecting from the surface of the plate and having its edges at an angle to those of the plate.

6. A drawing instrument consisting of a plate having lines radiating from two or more of its corners, and a block projecting from the plate and filling the quadrilateral formed by the intersection of four of said radiating lines.

7. A drawing instrument consisting of a plate, an approximately central block projecting therefrom with its edges at an angle to those of the plate, and additional blocks projecting from the same face of the plate and having two of their edges in alinement with the corresponding edges of the central block.

8. A drawing instrument, comprising a transparent or translucent rectangular plate having a longitudinal scale along one edge, a transverse scale spaced from one edge, a block secured to the plate approximately at its center and having its edges at an angle to the edges of the plate, and blocks secured to the plate near two corners, said blocks having two of their edges in alinement with the corresponding edges of the central block.

In testimony whereof I have signed my name to this specification in the presence of two subscribing witnesses.

EMIL CHRISTIAN LOETSCHER.

Witnesses:
T. C. HICKSON,
W. G. HALL.